(12) United States Patent
Akimatsu

(10) Patent No.: US 8,605,342 B2
(45) Date of Patent: Dec. 10, 2013

(54) IMAGE READING APPARATUS

(75) Inventor: Takayuki Akimatsu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 179 days.

(21) Appl. No.: 13/073,065

(22) Filed: Mar. 28, 2011

(65) Prior Publication Data

US 2011/0242623 A1    Oct. 6, 2011

(30) Foreign Application Priority Data

Mar. 30, 2010   (JP) ................. 2010-077125

(51) Int. Cl.
| | | |
|---|---|---|
| H04N 1/04 | (2006.01) | |
| H04N 1/00 | (2006.01) | |
| H04N 1/46 | (2006.01) | |
| G06F 15/00 | (2006.01) | |
| B65H 3/16 | (2006.01) | |
| G03G 15/00 | (2006.01) | |

(52) U.S. Cl.
USPC ............ 358/498; 358/1.9; 358/474; 358/400; 358/505; 271/18.1; 399/367

(58) Field of Classification Search
USPC .................. 358/498, 1.9, 474, 400; 271/18.1; 399/367; 707/101
See application file for complete search history.

(56) References Cited

U.S. PATENT DOCUMENTS

| | | | |
|---|---|---|---|
| 5,923,438 A | 7/1999 | Fujiwara | |
| 6,178,274 B1 | 1/2001 | Youda et al. | |
| 6,347,213 B1 * | 2/2002 | Yamanaka et al. | ............ 399/367 |
| 6,349,155 B1 | 2/2002 | Youda et al. | |
| 7,035,566 B2 | 4/2006 | Aiba | |
| 7,209,677 B2 | 4/2007 | Aiba | |
| 7,379,700 B2 | 5/2008 | Iwata | |
| 7,738,146 B2 | 6/2010 | Osakabe et al. | |
| 7,755,810 B2 | 7/2010 | Kuse | |
| 2002/0176115 A1 * | 11/2002 | Yamamoto | .................... 358/400 |
| 2003/0038989 A1 * | 2/2003 | Yokota et al. | ................. 358/474 |
| 2003/0048466 A1 | 3/2003 | Yamada et al. | |
| 2003/0081269 A1 | 5/2003 | Aoyama et al. | |

(Continued)

FOREIGN PATENT DOCUMENTS

| | | |
|---|---|---|
| JP | HEI06-037995 A | 2/1994 |
| JP | HEI07-291476 A | 11/1995 |

(Continued)

OTHER PUBLICATIONS

Co-pending U.S. Appl. No. 13/073,018, filed Mar. 28, 2011.

(Continued)

*Primary Examiner* — Charlotte M Baker
*Assistant Examiner* — Rury Grisham
(74) *Attorney, Agent, or Firm* — Banner & Witcoff, Ltd.

(57) ABSTRACT

An image reading apparatus may include a main unit, a cover unit, an openable unit, and a conductive member. The cover unit is pivotable relative to the main unit, and includes a metal frame and a reading device configured to read an image of a document conveyed through an upper path of a U-shaped conveying path. The openable unit is pivotable relative to the cover unit, and includes a document pressing member configured to face the reading device when the openable unit is closed relative to the cover unit. The conductive member is configured to electrically connect the metal frame and the document pressing member.

9 Claims, 10 Drawing Sheets

(56) References Cited

U.S. PATENT DOCUMENTS

| | | | |
|---|---|---|---|
| 2004/0223796 A1* | 11/2004 | Iwata | 399/367 |
| 2005/0046912 A1 | 3/2005 | Nobe et al. | |
| 2007/0019249 A1 | 1/2007 | Osakabe et al. | |
| 2007/0047023 A1 | 3/2007 | Oguri et al. | |
| 2007/0268529 A1 | 11/2007 | Kuse | |
| 2008/0158621 A1 | 7/2008 | Hamada et al. | |
| 2009/0049072 A1* | 2/2009 | Wakahara | 707/101 |
| 2009/0122365 A1* | 5/2009 | Noda et al. | 358/498 |
| 2010/0072690 A1* | 3/2010 | Hiura et al. | 271/18.1 |
| 2010/0165368 A1* | 7/2010 | Matsuoka | 358/1.9 |
| 2012/0170087 A1 | 7/2012 | Nose et al. | |

FOREIGN PATENT DOCUMENTS

| | | |
|---|---|---|
| JP | HEI08-340418 A | 12/1996 |
| JP | HEI10-112771 A | 4/1998 |
| JP | 10-145548 | 5/1998 |
| JP | 2000-134417 A | 5/2000 |
| JP | 2000-188665 A | 7/2000 |
| JP | 2002-199168 | 7/2002 |
| JP | 2003-051918 A | 2/2003 |
| JP | 2003-140275 | 5/2003 |
| JP | 2004-348124 A | 12/2004 |
| JP | 2005-080128 | 3/2005 |
| JP | 2005-167839 A | 6/2005 |
| JP | 2006-333003 | 12/2006 |
| JP | 2007-036426 A | 2/2007 |
| JP | 2007-067810 | 3/2007 |
| JP | 2007-311863 A | 11/2007 |
| JP | 2008-156108 A | 7/2008 |
| JP | 2000-236415 A | 8/2008 |

OTHER PUBLICATIONS

Co-pending U.S. Appl. No. 13/073,105, filed Mar. 28, 2011.
JP Notice of Reasons for Rejection dated Feb. 7, 2012, corresponding Application No. 2010-077124; English Translation.
JP Decision to Grant a Patent dated Feb. 14, 2012, corresponding Application No. 2010-077125; English Translation.
JP Office Action dtd Mar. 27, 2012, JP Appln. 2010-077123, English translation.
Non-final Office Action received in U.S. Appl. No. 13/073,105 mailed Feb. 13, 2013.
Non Final Office Action received in U.S. Appl. No. 13/073,018 mailed May 8, 2013.
Final Office Action received in U.S. Appl. No. 13/073,105 mailed Jul. 24, 2013.

* cited by examiner

Fig.1
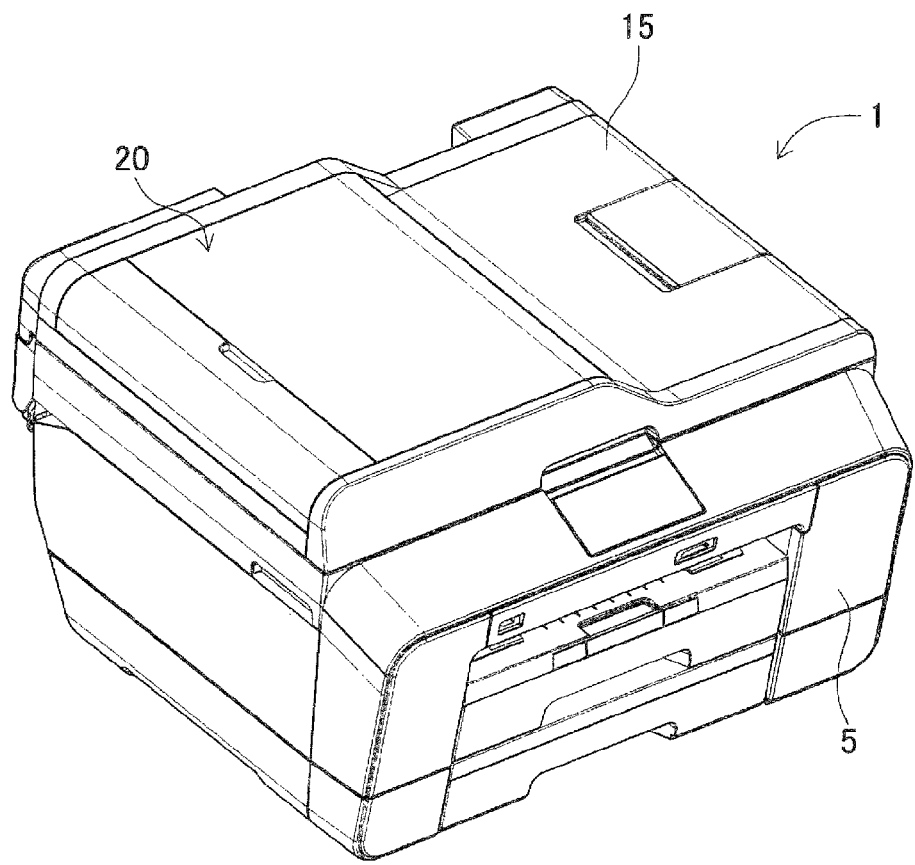
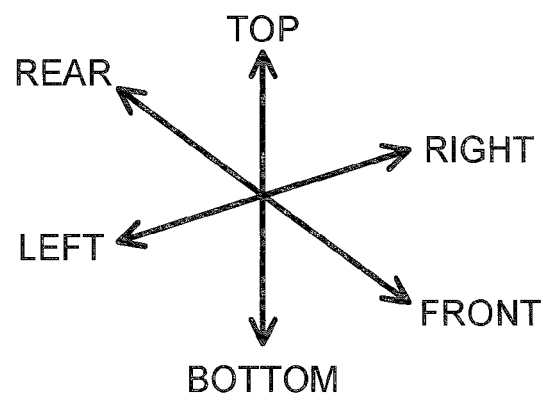

Fig.2
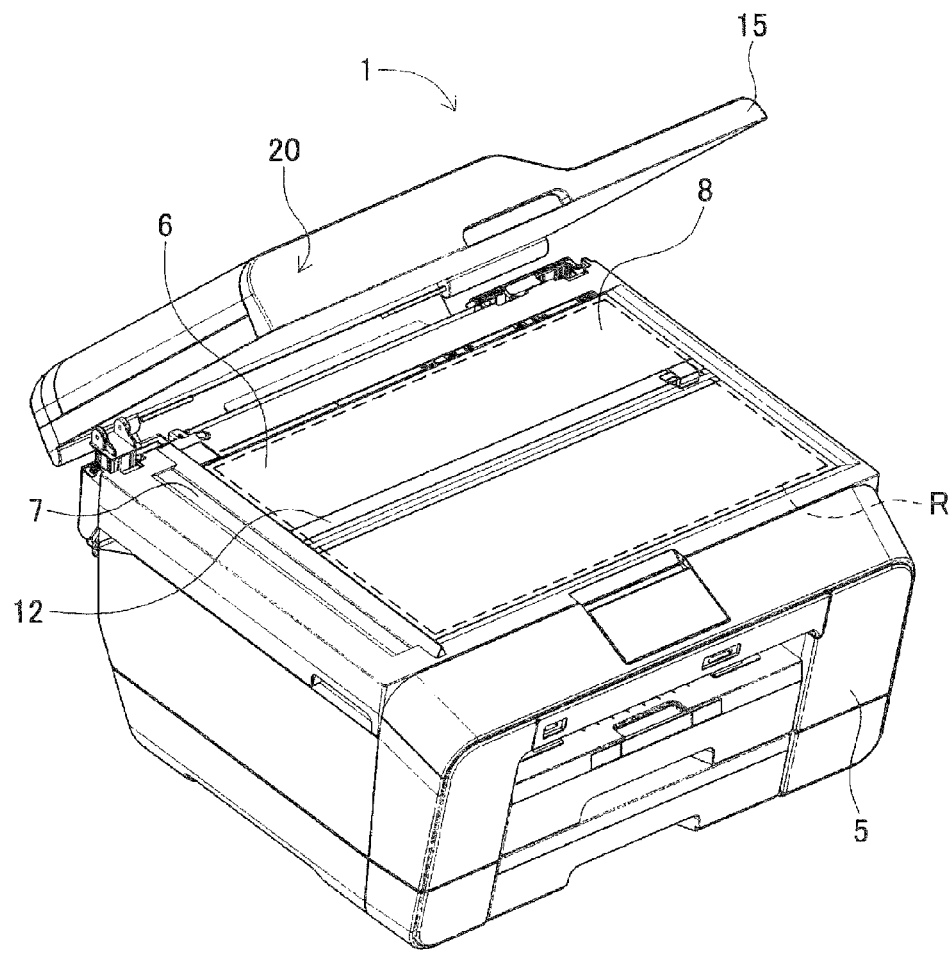
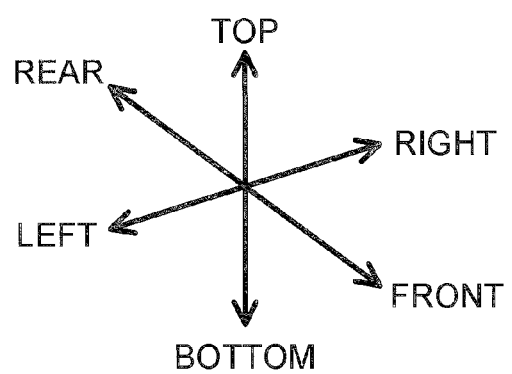

IMAGE READING APPARATUS

CROSS REFERENCE TO RELATED APPLICATION

This application claims priority from Japanese Patent Application No. 2010-077125, filed on Mar. 30, 2010, the entire subject matter and contents of which is incorporated herein by reference.

TECHNICAL FIELD

Aspects of the invention relate to an image reading apparatus configured to convey a document through a conveying path and read an image of the document.

BACKGROUND

Some existing image reading apparatuses may include a reading device and be configured to read an image of a document using the reading device while conveying the document through a conveying path.

A known image reading apparatus includes a generally U-shaped conveying path connecting a document placement tray and a document ejection tray, and conveys a document placed on the document placement tray along the conveying path. The image reading apparatus includes a first image reading device and a second image reading device. The image reading apparatus is configured to read an image formed on a front side of the document using the first image reading device and then read an image formed on a back side of the document using the second image reading device while conveying the document along the conveying path.

The image reading apparatus is capable of a document fixing mode for reading an image of a document placed at rest on the platen glass and a document moving mode for reading an image of a document while moving or conveying the document along the conveying path. Thus, the first image reading device is disposed below the platen glass and facing a lower surface of the conveying path, and configured to read an image formed on a first surface of a document being conveyed. The second image reading device is disposed facing an upper surface of the conveying path on a downstream side of the first image reading device in a conveying direction in which a document is conveyed, and configured to read an image formed on a second surface of the document conveyed below the second image reading device.

SUMMARY

Aspects of the invention may provide an image reading apparatus including a main unit, a cover unit, an openable unit, and a conductive member. The cover unit is configured to be pivotable relative to the main unit, and includes a metal frame, a document tray configured to receive a document, an ejection portion configured to receive the document, a document conveying mechanism configured to convey the document from the document tray to the ejection portion along a conveying path, and a cover unit-side reading device. The conveying path has an upper path, a lower path, and a curved path connecting the upper path and the lower path. The cover unit-side reading device is configured to read an image of the document conveyed through the upper path. The openable unit is configured to move between an open position to expose the upper path and a closed position to cover the upper path, the openable unit including a document pressing member. The document pressing member faces the cover unit-side reading device when the openable unit is in the closed position. The conductive member is configured to electrically connect the metal frame of the cover unit and the document pressing member of the openable unit.

BRIEF DESCRIPTION OF THE DRAWINGS

Illustrative aspects of the invention will be described in detail with reference to the following figures in which like elements are labeled with like numbers and in which:

FIG. 1 is a perspective view of an image reading apparatus;

FIG. 2 is a perspective view of the image reading apparatus in which a cover unit is open;

DETAILED DESCRIPTION

An illustrative embodiment of the invention will be described in detail with reference to the accompanying drawings.

The general structure of an illustrative image reading apparatus 1 as an example of an image reading apparatus according to illustrative aspects of the disclosure will be described with reference to FIGS. 1, 2, and 3.

For ease of discussion, in the following description, the top or upper side, the bottom or lower side, the left or left side, the right or right side, the front or front side, and the rear or rear side are used to define the various parts when the image reading apparatus 1 is disposed in an orientation in which it is intended to be used. In FIG. 1, the lower right side is referred to as the front or front side, the upper left side is referred to as the rear or the rear side, the up side is referred to as the top or upper side, the down side is referred to as the bottom or lower side, the lower left side is referred to as the left or left side, and the upper right side is referred to as the right or right side.

Figure 3:
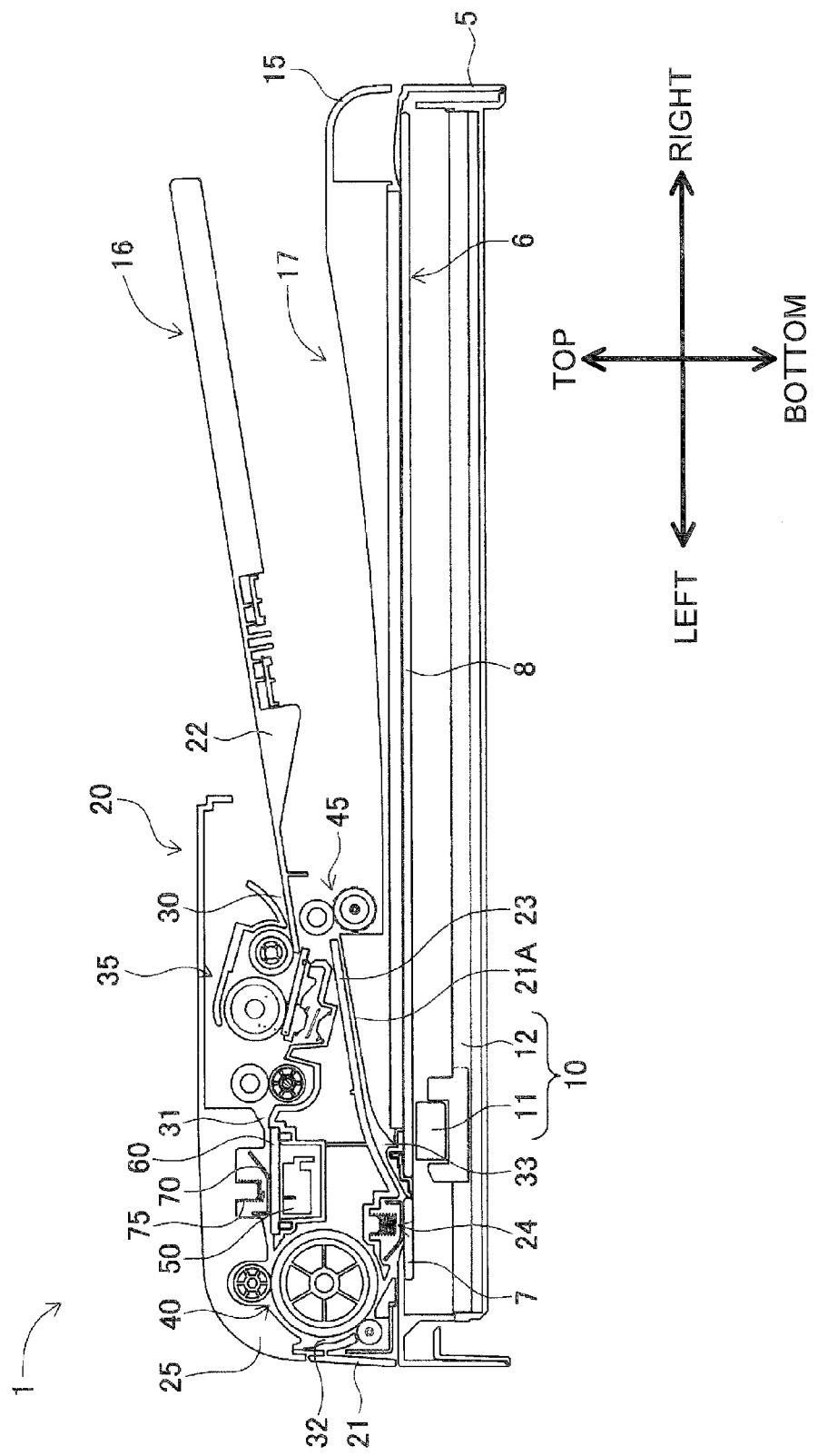
FIG. 3 is a cross sectional view illustrating a structure of the cover unit.

As shown in FIGS. 1, 2, and 3, the image reading apparatus 1 includes a main unit 5 including a first image reading device 10, and a cover unit 15 including an automatic document feeder (ADF) 20. The first image reading device 10 is an example of a main unit-side reading device.

As shown in FIGS. 2 and 3, the main unit 5 includes a contact glass 6 on the top surface. The contact glass 6 includes a first glass 7 and a second glass 8. The first glass 7 is used when the first image reading device 10 remains stationary at a predetermined position and reads an image of a document conveyed by the ADF 20. When there are some documents to be read on the ADF 20, the documents are serially conveyed to pass over the first glass 7.

The second glass 8 is what is called a platen glass, and the long side of the second glass 8 extends along the right and left direction of the main unit 5. The second glass 8 is shaped in a rectangle slightly greater than A3 size. The second glass 8 is used when a first image sensor 11 of the first image reading device 10 moves to read an image of a document placed on the second glass 8.

As shown in FIGS. 2 and 3, the main unit 5 includes the first image reading device 10 below the contact glass 6. The first image reading device 10 includes the first image sensor 11 and a slid shaft 12. The first image sensor 11 is a so-called contact image sensor, CIS, and configured to read an image of a document on the contact glass 6.

The first image sensor 11 has a reading range whose length corresponds to the short side of the A3 size in the main scanning direction (that is, the front-rear direction in the main unit 5). The slide shaft 12 extends in the right-left direction in the main unit 5, and holds the first image sensor 11 such that the first image sensor 11 is slidable in the right-left direction. The first image sensor 11 can be slid along the slide shaft 12 by a motor and drive mechanism (e.g., a pulley and belt mechanism). The first image sensor 11 may be positioned at a stationary reading position under the first glass 7. In addition, the first image sensor 11 may be slidable in a range between a left position along the left edge of the second glass 8 and a right position away from the left position for a distance corresponding to the long side of the A3 size. Thus, the first image reading device 10 has the maximum reading range R corresponding to A3 size, and can read an image of a document of a size smaller than or equal to A3 size.

As shown in FIGS. 1 and 2, the cover unit 15 is disposed pivotally on the rear end of the top surface of the main unit 5 between a closed position shown in FIG. 1 and an open position shown in FIG. 2. The cover unit 15 covers the top surface of the main unit 5 when in the closed position. Thus, the cover unit 15 is configured to fix a document set on the second glass 8, in position. As shown in FIG. 3, the cover unit 15 includes a document tray 16, an ejection tray 17, and the ADF 20. The document tray 16 is disposed on an upper right side of the cover unit 15 and configured to receive a stack of documents to be read. The ejection tray 17 is an example of an ejection portion and is disposed on the right side of the cover unit 15 and below the document tray 16, and configured to receive documents ejected from the ADF 20. The document tray 16 and the ejection tray 17 are arranged vertically.

The ADF 20 is disposed on the left side of the cover unit 15 and configured to successively and singly at a time feed documents in the document tray 16 through a U-shaped conveying path 30 to the ejection tray 17. In the embodiment, a direction from the document tray 16 along the U-shaped conveying path 30 to the ejection tray 17 is referred to as a document conveying direction. The ADF 20 includes a second image reading device 50 in a specified position along the U-shaped conveying path 30. The image reading apparatus 1 can read an image of a first surface (e.g. a back surface) of a document conveyed through the U-shaped conveying path 30 by the second image reading device 50. The second image reading device 50 is an example of a cover unit-side reading device.

Figure 4:
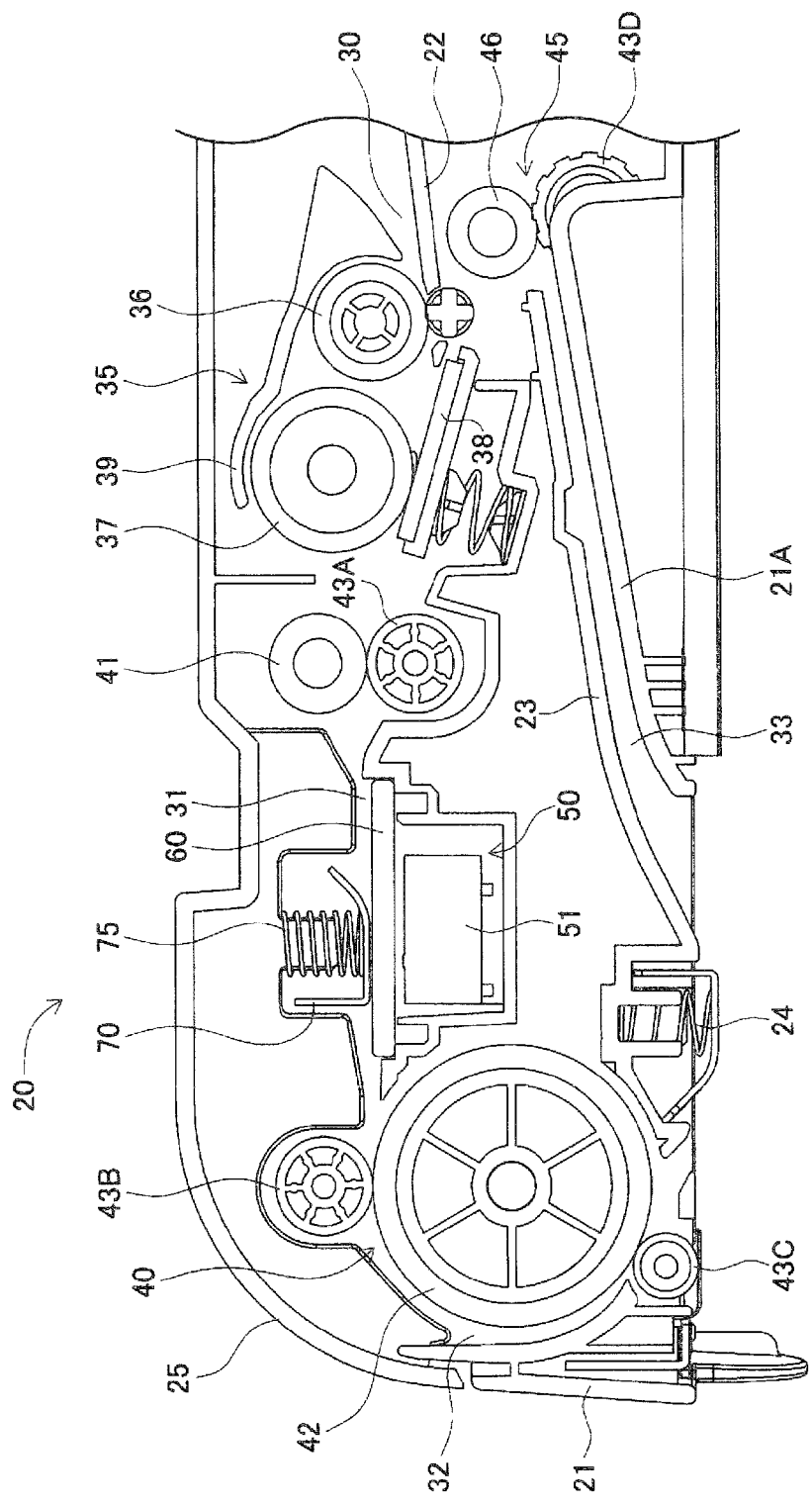
FIG. 4 is an enlarged cross sectional view illustrating a structure of an automatic document feeder.

As shown in FIGS. 3 and 4, the ADF 20 includes an opening in a specified position on the left side of the bottom surface of the ADF 20 (that is the bottom surface of the cover unit 15). The opening extends in the front-rear direction of the main unit 5 and faces the U-shaped conveying path 30. When the cover unit 15 is in the closed position, the opening is located above the first glass 7. Thus, a document to be conveyed through the U-shaped conveying path 30 is exposed at the opening in which a second surface of the document (e.g. a front surface) faces down. As a result, when the first image sensor 11 is located in the stationary reading position, the image reading apparatus 1 can read an image of the second surface of the document conveyed through the U-shaped conveying path 30 by the first image reading device 10.

The structure of the ADF 20 according to the embodiment will be described with reference to FIG. 3.

As shown in FIG. 3, the ADF 20 includes the U-shaped conveying path 30, a supply unit 35, a conveying unit 40, an ejection unit 45, and a second image reading device 50. With this structure, a document is conveyed and an image of the document is read through the U-shaped conveying path 30.

The ADF 20 further includes a main frame 21, an upper guide 22, a lower guide 23, and an openable member 25. The main frame 21 constitutes a casing of the ADF 20 and is made of a synthetic resin, e.g. acrylonitrile butadiene styrene (ABS) resin.

The upper guide 22 is formed by extending a downstream end of the document tray 16 in the document conveying direction and configured to guide a document in the document tray 16 toward the supply unit 35. The lower guide 23 extends from the opening to the ejection tray 17, and is configured to guide the document conveyed through the U-shaped conveying path 30 to the ejection unit 45 and ejection tray 17. That is, the upper guide 22 and the lower guide 23 are arranged vertically such that the upper guide is located above the lower guide 23.

The openable member 25 constitutes the top surface of the ADF 20, and is pivotally supported on a rotation shaft positioned at the left end of the ADF 20 (that is, the left end of the cover unit 15). The openable member 25 is configured to move between a closed position shown in FIGS. 3 and 4 and an open position shown in FIG. 5. When the openable member 25 is in the closed position, the openable member 25 covers the supply unit 35, the conveying unit 40, and the upper portion of the second image reading device 50. Thus, the upper portion of the U-shaped conveying path 30 is covered. When the openable member 25 is in the open position, the openable member 25 is separated from the supply unit 35, the conveying unit 40 and the second image reading device 50, and the upper portion of the U-shaped conveying path 30 is exposed.

The structure of the U-shaped conveying path 30 in the ADF 20 will be described.

As shown in FIGS. 3 and 4, the U-shaped conveying path 30 is formed in a U-shape with respect to the right and left direction of the ADF 20 so as to connect the document tray 16 and the ejection tray 17. In other words, the U-shaped conveying path 30 is not configured to convey a document in the front-rear direction of the ADF 20. The U-shaped conveying path 30 is defined by a first conveying path 31, a curved conveying path 32, and a second conveying path 33. The first conveying path 31 is an example of an upper path, and the second conveying path is an example of a lower path.

Figure 5:
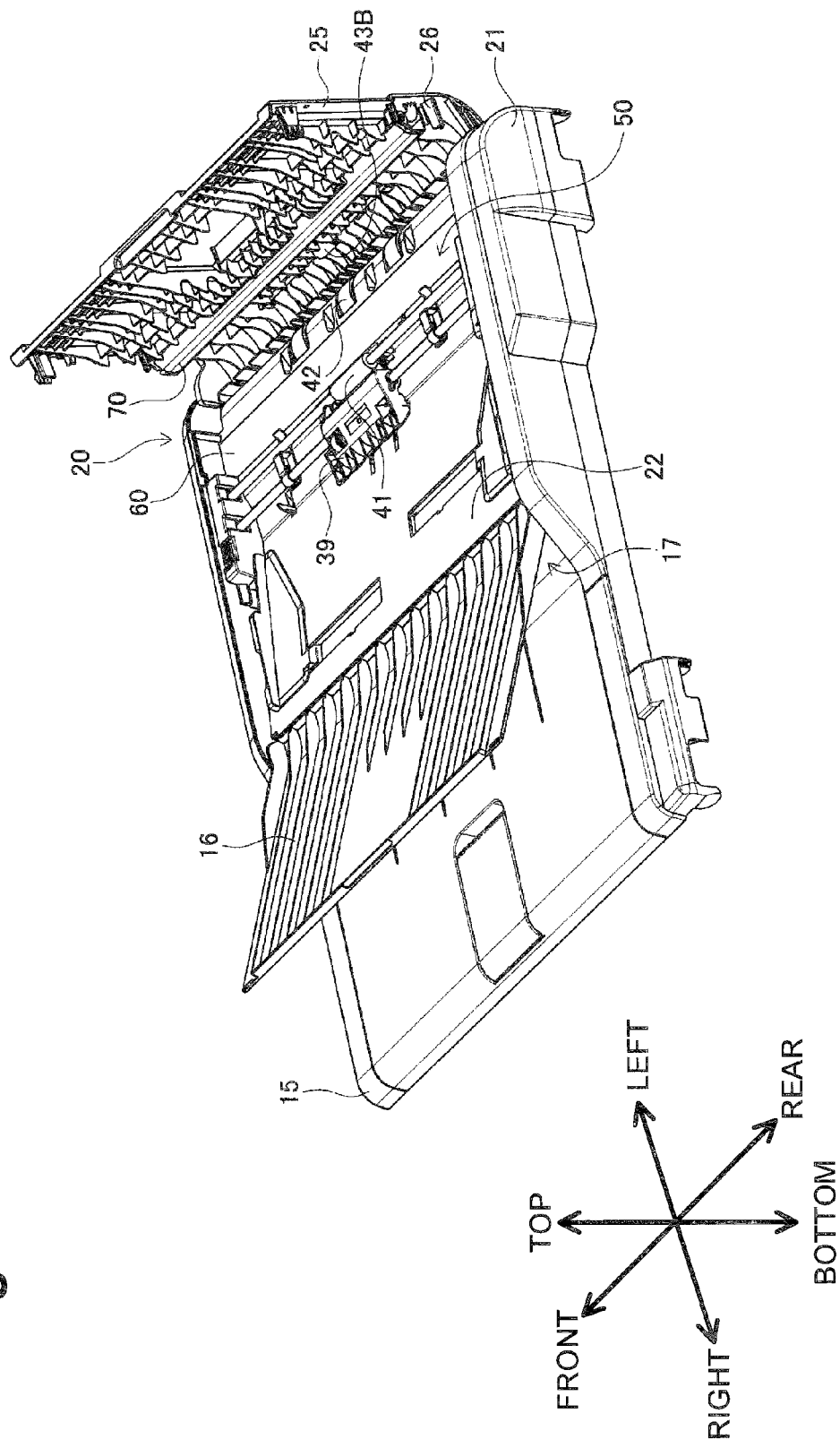
FIG. 5 is a perspective view of the cover unit in which an openable member is in an open position.

The first conveying path 31 extends from the downstream end of the document tray 16 in the document conveying direction to the left end of the ADF 20 (above a main roller 42 shown in FIG. 4). When the openable member 25 is in the closed position, the openable member 25 covers the first conveying path 31 from above. As shown in FIG. 5, the inside surface of the openable member 25 is provided with a plurality of ribs, which protrude toward the first conveying path 31 when the openable member 25 is in the closed position. These ribs are configured to guide an upper surface of a document to be conveyed in the first conveying path 31. In other words, the inside surface of the openable member 25 defines an upper surface of the first conveying path 31, together with a pickup roller 36 and a separation roller 36 of the supply unit 35, a conveying roller 41 of the conveying unit 40, and a document pressing member 70, which will be described later. The lower surface of the first conveying path 31 is defined by the upper surface of the upper guide 22, a separation pad 38, and a glass member 60 positioned above the second image reading device 50. These components defining the upper and lower surfaces of the first conveying path 31 comprise a first document conveying mechanism.

The curved conveying path 32 is curved downward from a downstream end of the first conveying path 31 in the document conveying direction to have a semicircular arc shape. As shown in FIG. 4, the curved conveying path 32 conforms to an outer surface of the main roller 42 and is connected to the second conveying path 33 on the left side of the ADF 20 (under the main roller 42). The curved conveying path 32 is defined by the outer surface of the main roller 42 and the main frame 21 and the inside surfaces of the openable member 25. These components defining the curved conveying path 32 comprise a curved document conveying mechanism.

The second conveying path 33 generally straightly extends from the lower end of the curved conveying path 32 to the ejection unit 45 and the ejection tray 17. The second conveying path 33 is defined mainly by the lower guide 23 and a wall surface 21A of the main unit 21 of the cover unit 15, which is disposed facing and away from the lower guide 23. These components defining the second conveying path 33 comprise a second document conveying mechanism. The second conveying path 33 is located below the first conveying path 31. The second conveying path 33 includes a part facing the first glass 7 in the proximity of the main roller 42. When the document passes through the part facing the first glass 7, the document passes over the opening formed in the bottom surface of the cover unit 15. Thus, a document conveyed through the U-shaped conveying path 30 is conveyed via the opening to the ejection tray 17. A known document pressing portion 24 is disposed at a position facing the opening in the second conveying path 33. The document pressing portion 24 can bring the document closer to the first glass 7 when the document passes above the opening. Thus, the image reading apparatus 1 can improve the image reading accuracy by the first image reading device 10 at the first glass 7.

The supply unit 35 of the ADF 20 will be described with reference to FIG. 4.

The supply unit 35 is disposed in the proximity of an end of the first conveying path 31 closer to the document tray 16. The supply unit 35 is configured to separate documents placed on the document tray 16 and supply a document at one time toward the conveying unit 40. As shown in FIG. 4, the supply unit 35 includes a pickup roller 36, a separation roller 37, a separation pad 38, and an arm 39.

The pickup roller 36 is rotatably supported in a position along the upper surface of the first conveying path 31 on an upstream side in the supply unit 35 in the document conveying direction. The pickup roller 36 is driven and rotated in a predetermine direction (e.g. clockwise in FIG. 4) by drive of a motor (not shown) via a known transmission mechanism. The pickup roller 36 is configured to convey a document placed in the document tray 16 to the separation roller 37 (toward the downstream side in the document conveying direction).

The separation roller 37 is rotatably supported to the main frame 21 on the downstream side from the pickup roller 36 in the document conveying direction. The separation roller 37 is driven and rotated in a predetermined direction (e.g. clockwise in FIG. 4) by drive of a motor (not shown). The separation pad 38 is disposed at a position facing the separation roller 37 on the lower surface of the first conveying path 31. The separation pad 38 is urged toward the separation roller 37. Thus, the separation roller 37 and the separation pad 38 operate together such as to separate a document directly contacting the separation roller 37 and convey the document only to the conveying unit 40 (to the downstream side in the document conveying direction).

The arm 39 is supported via bearings to the rotation shaft of the separation roller 37. The arm 39 extends from the shaft of the separation roller 37 toward an upstream side in the document conveying direction, and rotatably supports both ends of the pickup roller 36. The arm 39 is configured to rock on the rotation shaft of the separation roller 37 by drive from the motor.

The conveying unit 40 of the ADF 20 will be described with reference to FIG. 4.

The conveying unit 40 is disposed on a downstream side of the supply unit 35 in the document conveying direction, and configured to convey the document supplied by the supply unit 35 along the U-shaped conveying path 30 toward the ejection unit 45. The conveying unit 40 includes a conveying roller 41, the main roller 42, and pinch rollers 43A, 43B, and 43C.

The conveying roller 41 is disposed on a downstream side of the supply unit 35 in the document conveying direction and in a position conforming to the upper surface of the first conveying path 31. The conveying roller 41 is driven by drive of a motor (not shown) and rotated. The pinch roller 43A is disposed at a position facing the conveying roller 41 in the first conveying path 31. Thus, the document supplied by the supply unit 35 is pinched by the conveying roller 41 and the pinch roller 43A and conveyed in the first conveying path 31 toward the downstream side in the document conveying direction along with the rotation of the conveying roller 41.

The main roller 42 is rotatably supported to the main frame 21 at the left end of the ADF 20, and driven by drive of a motor (not shown) and rotated. As described above, the curved conveying path 32 is formed conforming to the outer surface of the main roller 42.

The pinch roller 43B is disposed in the boundary between the first conveying path 31 and the curved conveying path 32 in an upper position of the main roller 42 and rotatably supported facing the main roller 42. Thus, the main roller 42 pinches the document conveyed in the first conveying path 31 along with the pinch roller 43B and rotates due to the drive of the motor such as to convey the document to the curved conveying path 32.

The pinch roller 43C is disposed in the boundary between the curved conveying path 32 and the second conveying path 33 in a lower position of the main roller 42 and rotatably supported facing the main roller 42. Thus, the main roller 42 pinches the document conveyed in the curved conveying path 32 along with the pinch roller 43C and rotates due to the drive of the motor so as to convey the document to the second conveying path 33.

The ejection unit 45 of the ADF 20 will be described with reference to FIG. 4.

The ejection unit 45 is configured to eject the document conveyed through the U-shaped conveying path 30 to the ejection tray 17. The ejection unit 45 includes an ejection roller 46 and the pinch roller 43D. The ejection roller 46 is rotatably supported at a position along the upper surface of the second conveying path 33 in the vicinity of the downstream end of the second conveying path 33 in the document conveying direction (that is, in the vicinity of the termination of the U-shaped conveying path 30). The ejection roller 46 is configured to rotate due to the drive of the motor. The pinch roller 43D is rotatably supported facing the ejection roller 46 from below via the second conveying path 33. Thus, the ejection roller 46 pinches the document conveyed through the second conveying path 33 along with the pinch roller 43D and rotates due to the drive of the motor so as to eject the document to the ejection tray 17.

The second image reading device 50 disposed in the ADF 20 will be described.

The second image reading device 50 is configured to read an image of a document conveyed in the first conveying path 31. As shown in FIG. 4, the second image reading device 50 is disposed downstream from the conveying roller 41 and upstream from the main roller 42 in the document conveying direction, and facing the lower surface of the first conveying path 31. The second image reading device 50 includes a second image sensor 51, a sensor holder 52, and a glass member 60.

The second image sensor 51 is what is called a contact image sensor (CIS), and is disposed with its reading surface for reading an image, facing up (toward the first conveying path 31). The second image sensor 51 has a reading range whose length corresponds to the short side of A4 size in the main scanning direction (that is, the front-rear direction in the main unit 5). A document conveyed in the first conveying path 31 passes over the reading surface of the second image sensor 51. Thus, the image reading apparatus 1 is configured to read an image formed on a surface (e.g. back surface) of a document conveyed in the first conveying path 31 by the second image reading device 50.

The glass member 60 is made of a reinforced glass and performs the same function as the first glass 7 and the second glass 8 for the first image sensor 11. The glass member 60 is disposed above the second image sensor 51 and along the lower surface of the first conveying path 31, and constitutes a part of the first conveying path 31.

The ADF 20 includes a document pressing member 70 and an urging member 75. The document pressing member 70 and the urging member 75 are disposed facing the second image reading device 50 via the first conveying path 31. Specifically, as shown in FIGS. 4-8, the document pressing member 70 and the urging member 75 are disposed in position on an inner wall surface of the openable member 25. The openable member 25, the pressing member 70, and the urging member 75 comprise an openable unit. When the openable member 25 is in the closed position, the document pressing member 70 and the urging member 75 face the second image reading device 50 via the first conveying path 31. The urging member 75 is configured to urge the document holding member 70 toward the first conveying path 31 and the second image reading device 50 by its elastic force. Thus, the document pressing member 70 is configured to press the document conveyed in the first conveying path 31 toward the second image reading device 50. With this arrangement, the image reading apparatus 1 can improve the image reading accuracy of the second image reading device 50.

The following will describe automatic document reading operation for reading images on both surfaces (a first surface and a second surface) of a document in the image reading apparatus 1 according to the embodiment. In the following description, it is assumed that documents to be read are set in the document tray 16 with their first surfaces facing up and the first image sensor 11 is located in the stationary reading position under the first glass 7.

The uppermost document set in the document tray 16 contacts the pickup roller 36 of the supply unit 35. Thus, the document is supplied from the document tray 16 by the rotation of the pickup roller 36 due to the drive of the motor, and is conveyed via the separation roller 37 along the first conveying path 31 to the conveying unit 40. The document conveyed to the conveying unit 40 is conveyed by the conveying roller 41 and the pinch roller 43A, and passes over the second image reading device 50. At this time, as the second surface of the document faces the second image reading device 50, the second image reading device 50 reads an image formed on the second surface of the document.

After passing over the second image reading device 50, the document goes in the curved conveying path 32, and is conveyed to the ejection unit 45 by the rotation of the main roller 42. After passing through the curved conveying path 32, the first surface of the document faces down. When going in the second conveying path 33 after the curved conveying path 32, the document reaches the document pressing portion 24 and the first glass 7. As described above, the opening is formed on the bottom surface of the cover unit 15 and in the vicinity of the document pressing portion 24. The document is exposed from the opening. The first glass 7 is located in the position facing the opening, and the first image sensor 11 is located below the first glass 7. Thus, the first surface of the document faces the first image reading device 10. When the document passes in an area of the second conveying path 33, which is formed by the document pressing portion 24 and the first glass 7, the first image reading device 10 reads an image of the first surface of the document.

After the image is read by the first image reading device 10, the document is conveyed along the second conveying path 33 to the ejection unit 45. When reaching the ejection unit 45, the document is conveyed to the ejection tray 17 by the rotation of the ejection roller 46.

The openable member 25 in the image reading apparatus 1 according to the embodiment will be described in detail.

As shown in FIGS. 3-5, the openable member 25 constitutes the top surface of the ADF 20 and is supported by the main frame 21 such that the openable member 25 is pivotable on the rotation shaft positioned at the left end of the ADF 20. The rotation shaft is positioned downstream of the second image reading device 50 in the document conveying direction and in proximity to the left end of the curved conveying path 32 (in other words, a position protruding most leftward in the curved conveying path 32).

When the openable member 25 is pivoted on the rotation axis to the open position, the upper portion of the first conveying path 31 and the upper portion of the curved conveying path 32 (above the rotation shaft of the main roller 42) are exposed (FIGS. 4 and 5). Thus, when a document is jammed in the first conveying path 31 or the curved conveying path 32, the jammed document can be easily removed by moving the openable member 25 to the open position. When the openable member 25 is moved to the open position, the document pressing member 70 is also moved along with the openable member 25, and thus the upper portion of the second image reading portion 50 is exposed. Maintenance of the second image reading device 50 and the glass member 60 can be easily performed by moving the openable member 25 to the open position.

The document pressing member 70 and the urging member 75, which are disposed in the openable member 25, will be described in detail with reference to mainly FIG. 5.

As shown in FIGS. 3 and 4, the document pressing member 70 is disposed facing the second image reading device 50 when the openable member 25 is in the closed position. The document pressing member 70 is configured to press a document conveyed in the first conveying path 31 toward the second image reading device 50. The document pressing member 70 is formed by bending a metal plate having electrical conductivity. The document pressing member 70 is disposed movably in a predetermined range in directions away from and close to the second image reading device 50 (vertically in FIG. 4) when the openable member 25 is in the closed position.

Figure 6:
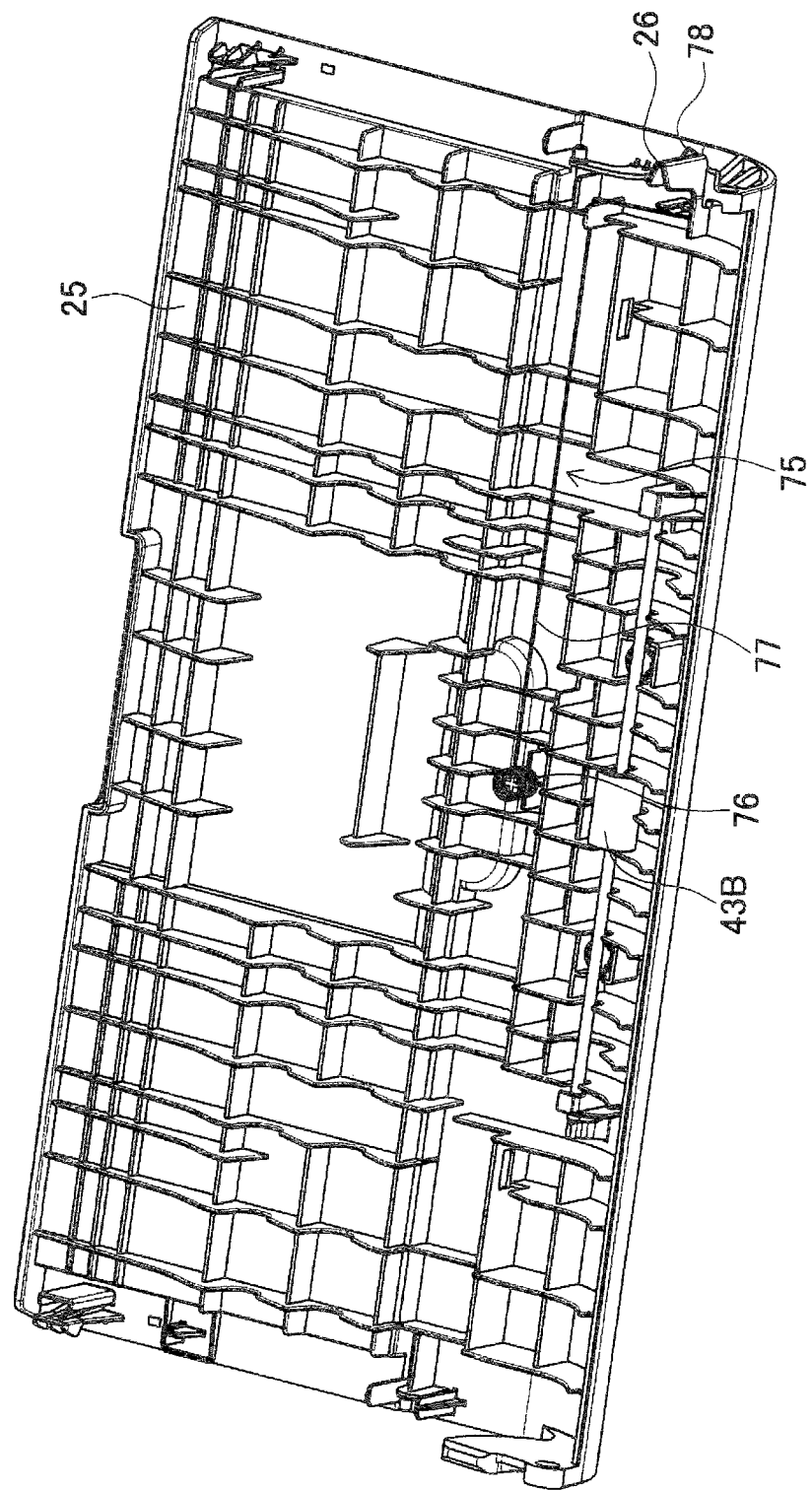
FIG. 6 is a perspective view showing the openable member in which an urging member is disposed.

As shown in FIG. 4, the urging member 75 is disposed between the document pressing member 70 and the inner wall surface of the openable member 25, and is configured to urge the document pressing member 70 toward the second image reading device 50. As shown in FIG. 6, the urging member 75 is formed of a wire of stainless steel (known as SUS in Japan) and includes a spring portion 76, a ground connection portion 77, and an openable member-side contact portion 78. The urging member 75 is an example of a first conductive member.

The spring portion 76 is formed by coiling the stainless steel wire and disposed at one end of the urging member 75. The spring portion 76 is an example of an urging portion. The spring portion 76 is disposed between the document pressing member 70 and the inner wall surface of the openable member 25. The spring portion 76 is configured to contact a central portion of the document pressing member 70 (FIGS. 5 and 6) and to urge the document pressing member 70 toward the second image reading device 50. Stainless steel has high corrosion resistance because it contains chromium combining with oxygen to form a passive film on its surface.

Figure 7:
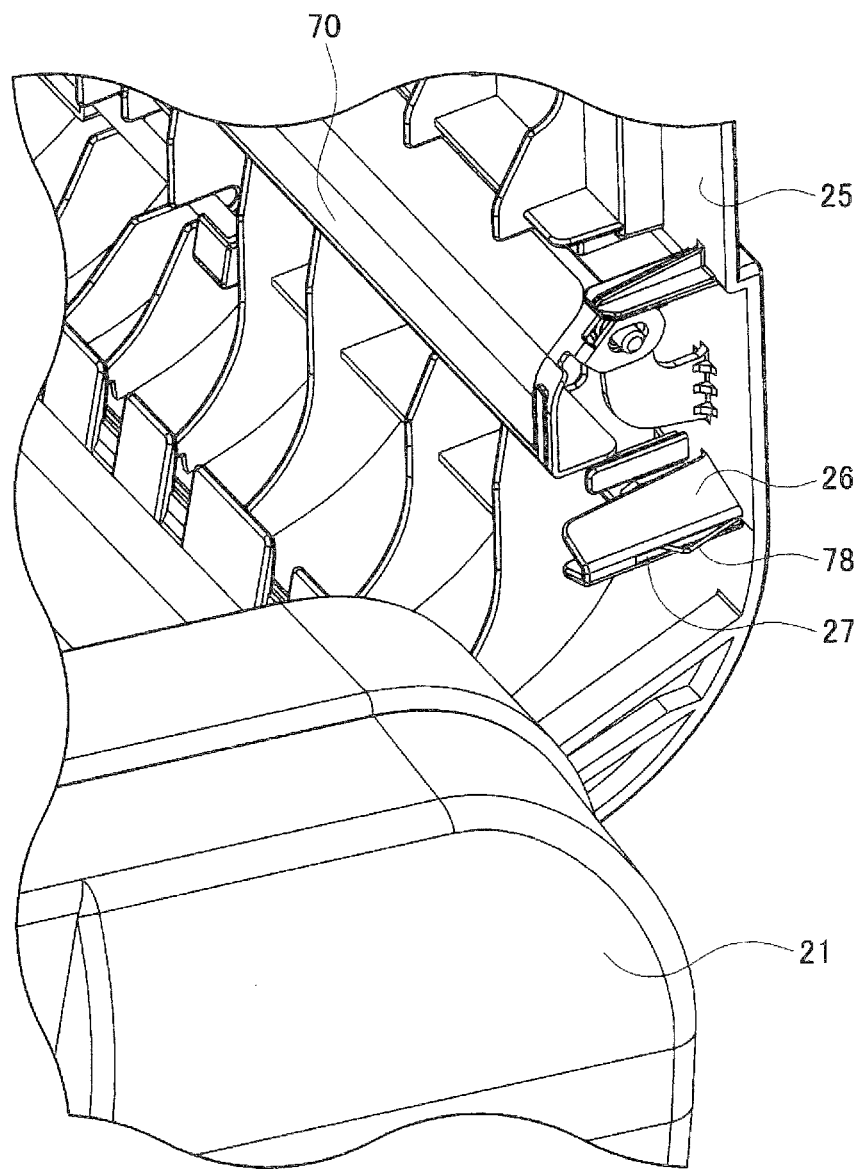
FIG. 7 is an enlarged perspective view of an openable member-side contact portion.

The ground connection portion 77 extends from the spring portion 76 along the inner wall surface of the openable member 25 toward a wire protection rib 26 (FIGS. 5-7).

Figure 9:
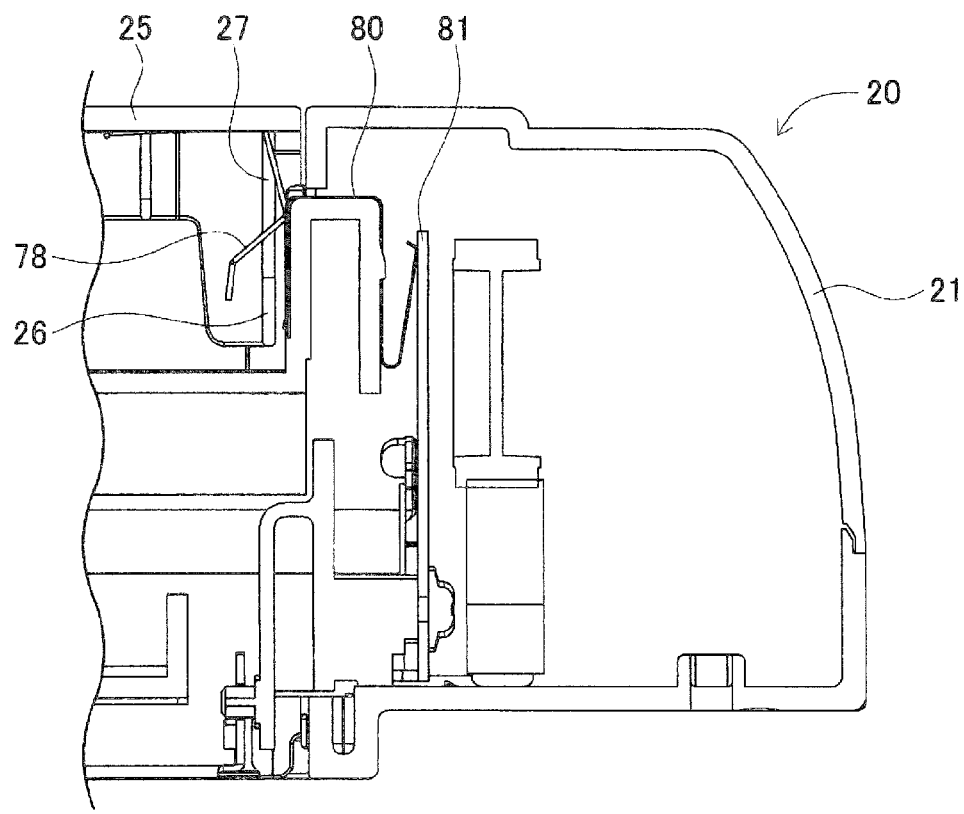
FIG. 9 is a cross sectional view of the openable member-side contact portion.

The openable member-side contact portion 78 is disposed at the other end of the urging member 75 and is formed by bending the stainless steel wire at a predetermined angle (in the form of a letter V) (FIG. 9). The openable member-side contact portion 78 extends vertically relative to the inner wall surface of the openable member 25 and is urged from the side end surface of the openable member 25 outward (in bottom left direction in FIG. 5). As shown in FIGS. 5-7 and 9, the openable member-side contact portion 78 is surrounded by the wire protection rib 26 formed in the openable member 25, and protrudes outward from a slit 27 formed in the wire protection rib 26. The wire protection rib 26 is an example of a protection member.

The wire protection rib 26 formed in the openable member 25 will be described.

The wire protection rib 26 stands on the side end surface of the openable member 25 (that is the rear end surface of the cover unit 15) such as to protrude outward in the longitudinal direction of the document pressing member 70. The wire protection rib 26 has generally a V-shaped cross section in a cross section taken along a line generally parallel to the inner wall surface of the openable member 25. The wire protection rib 26 stands on an end portion of the inner wall surface of the openable member 25 such that its corner portion of the V-shaped cross section extends in a direction perpendicular to the inner wall surface of the openable member 25. The corner portion includes a slit 27 having its long side in the direction perpendicular to the inner wall surface of the openable member 25.

As shown in FIGS. 6 and 9, the ground connection portion 77 enters the wire protection rib 26 from an open side of the V-shaped cross section. The openable member-side contact portion 78 is formed in a position caught by the wire protection rib 26 and protrudes outward from the side end surface of the openable member 25 via the slit 27. (It is a normal position.) The openable member-side contact portion 78 is formed such that it protrudes from the slit 27 by the urging force of the wire. The openable member-side contact portion 78 is configured to return to the normal position when released from external forces even if the openable member-side contact portion 78 is pressed to the inside of the wire protection rib 26 via the slit 27.

Figure 8:
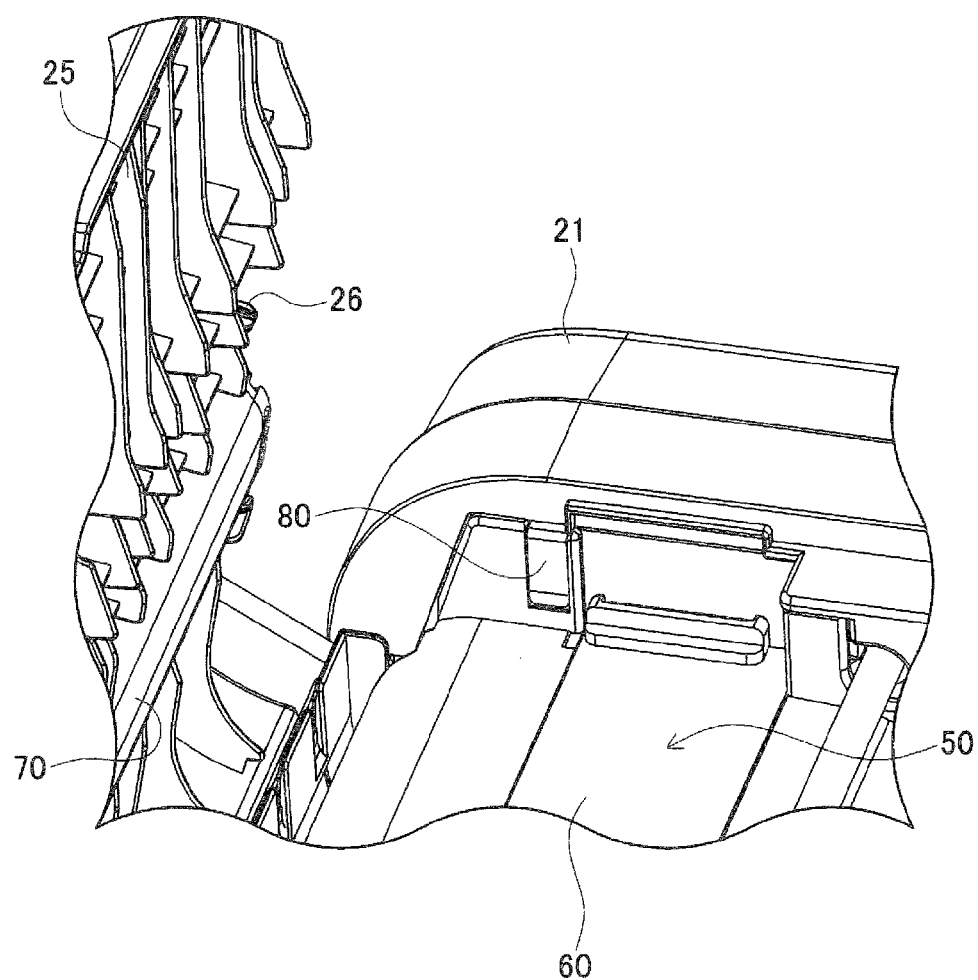
FIG. 8 is an enlarged perspective view of a main frame-side contact portion.

As shown in FIG. 8, the main frame 21 includes a main frame-side contact portion 80. The main frame-side contact portion 80 is disposed in a position facing the wire protection rib 26 and the openable member-side contact portion 78 when the openable member 25 is in the closed position. The main frame-side contact portion 80 is disposed in a position where a distance between the rotation shaft of the openable member 25 and the main frame-side contact portion 80 is equal to a distance between the wire protection rib 26 and the rotation shaft of the openable member 25 on the inner side surface of the main frame 21 (which is opposite to the side end surface of the openable member 25 when the openable member 25 is in the closed position). Thus, when the openable member 25 is moved to the closed position, the openable member-side contact portion 78 contacts the main frame-side contact portion 80. The main frame-side contact portion 80 is formed by bending a metal plate of stainless steel. The main frame-side contact portion 80 is an example of a second conductive member. As shown in FIG. 9, the main frame-side contact portion 80 contacts a metal frame 81 disposed inside the main frame 21. The metal frame 81 is connected to an outside of the image reading apparatus 1 via a ground on the main unit 5.

When the openable member 25 is moved to the closed position, the document pressing member 70 and the spring portion 76 are positioned close to and facing the second image reading device 50. The document pressing member 70 is made of metal and contacts the spring portion 76 (of the urging member 75 in FIG. 4). The spring portion 76 is integrally formed with the ground connection portion 77 and the openable member-side contact portion 78, which are formed of the stainless steel wire (FIG. 6). When the openable member 25 is in the closed position, the openable member-side contact portion 78 contacts the main frame-side contact portion 80 (FIG. 9). At this time, the document pressing member 75 and the metal frame 81 are electrically connected. Thus, electrical charges accumulating near the second image reading device 50 are cleared by the document pressing member 70 and the urging member 75, and are discharged to the outside of the image reading apparatus 1 via the main frame-side contact portion 80 and the metal frame 81. As a result, the image reading apparatus 1 can remove the electrical charges, which have been generated in accordance with conveying of a document in the first conveying path 31, from the second image reading device 50, and thus can reduce potential for failure of and damage to the second image reading device 50 due to the electrical charges.

When the openable member 25 is moved to the open position, the openable member-side contact portion 78 is separated from the main frame-side contact portion 80. The ground for protecting the second image reading device 50 is made up of the document pressing member 70 and the urging member 75, which are disposed on the openable member 25, and the main frame-side contact portion 80 and the metal frame 81, which are disposed in the main frame 21. With this structure, the ground for protecting the second image reading device 50 does not hinder the pivotal movement of the openable member 25. Thus, the openable member 25 is reliably and smoothly moved between the open position and the closed position. When the openable member 25 is moved to the open position, the second image reading device 50 is not under service conditions. When the conduction between the ground and the outside of the image reading apparatus 1 is interrupted, the second image reading device 50 is not adversely affected.

As described above, in the image reading apparatus 1 according to the embodiment, when the openable member 25 is moved to the open position (FIG. 5), the upper portion of the first conveying path 31 and upper portion of the curved conveying path 32 of the ADF 20 are exposed. Thus, when a document is jammed in the first conveying path 31 or the curved conveying path 32, the document can be removed from the ADF 20. The image reading apparatus 1 includes the second image reading device 50, which is disposed along the lower surface of the first conveying path 31 in a state where the reading surface of the second image reading device faces upward. Thus, in the image reading apparatus 1, when the openable member 25 is moved to the open position, the second image reading device 50 is exposed. As a result, the image reading apparatus 1 facilitates maintenance of the second image reading device 50 and cleaning of the glass member 60.

In the image reading apparatus 1, when the openable member 25 is moved to the closed position, the document pressing member 70 and the urging member 75 are brought close to the second image reading device 50. The document pressing member 70 is formed of metal plate and the urging member 75 is formed of wire that contacts the document pressing member 70 and the main frame-side contact portion 80. The main frame-side contact portion 80 is connected to the outside of the image reading apparatus 1 via the metal frame 81 and the ground of the main unit 5. Thus, the image reading apparatus 1 allows the document pressing member 70 and the urging force 75, which are configured to press a document toward the second image reading device 50, to function as a ground to eliminate electrical charges accumulating near the second image reading device 50. The image reading apparatus 1 can remove electrical charges and reduce the potential for failure and breakage of the second image reading device 50 due to the electrical charges.

In the image reading apparatus 1, the urging member 75 and the main frame-side contact portion 80 are formed of stainless steel, which is a metal having high corrosion resistance. Thus, the image reading apparatus 1 can reduce the drop of the continuity between the urging member 75 and the main frame-side contact portion 80, which may be caused by, for example, rust. Thus, the image reading apparatus 1 can remove the electrical charges using the document pressing member 70, the urging member 75, and the main unit-side contact portion 80, for a long time of period reliably, and can reduce the potential for failure and breakage of the second image reading device 50.

In the image reading apparatus 1, the openable member-side contact portion 78 formed of a wire is surrounded by the wire protection rib 26 formed in the openable member 25, and protrudes outward from the slit 27. The wire protection rib 26 extends along the longitudinal direction of the wire constituting the openable member-side contact portion 78, and is configured to protect the openable member-side contact portion 78 from external forces (e.g. a force to deform the openable member-side contact portion 78 such that the openable member-side contact portion 78 can not protrude from the slit 27 or can not be pressed inside). In other words, as the wire protection rib 26 can reduce potential for deformation of the openable member-side contact portion 78, the image reading apparatus 1 can maintain the contact between the openable member-side contact portion 78 and the main frame-side contact portion 80 in a reliable state, and remove electrical charges around the second image reading device 50.

The illustrative embodiment shows but is not limited to that the cover unit 15 includes the document tray 16 and the ejection tray 17 disposed below the document tray 16. The ejection tray 17 may be disposed above the document tray 16.

In this case, the upstream side and the downstream side in the document conveying direction in the U-shape conveying path 30 may be reversed.

The illustrative embodiment shows but is not limited to that the urging member 75 integrally includes the spring portion 76, the ground connection portion 77 and the cover-side connection portion 78. If the continuity between the spring portion 76 and the ground connection portion 77 is secured, the openable member-side contact portion 78 may be provided as an individual component (e.g. a metal plate).

The illustrative embodiment shows but is not limited to that the urging member 75 and the main frame-side contact portion 80 are formed of stainless steel. The urging member 75 and the main frame-side contact portion 80 may be formed of a different metal having high corrosion resistance. If the openable member-side contact portion 78 and a portion of the main frame-side contact portion 80 where the main frame-side contact portion 80 contacts the openable member-side contact portion 78 are formed of a metal having high corrosion resistance, e.g. stainless steel, the urging member 75 and the openable member-side contact portion 78 may not be formed of stainless steel entirely. The urging member 75 and the openable member-side contact portion 78 may be surface treated to enhance corrosion resistance.

The illustrative embodiment shows but is not limited to the wire protection rib 26.

The wire protection rib 26 may be formed in any shape as to protect the openable member-side contact portion 78 from deformation.

The illustrative embodiment shows but is not limited to the position of the rotation shaft of the openable member 25. The position of the rotation shaft of the openable member 25 may be changed within a range where the rotation shaft is disposed closer to the main roller 42 than to the second image reading device 50 and outside of the curved conveying path 32.

Figure 10:
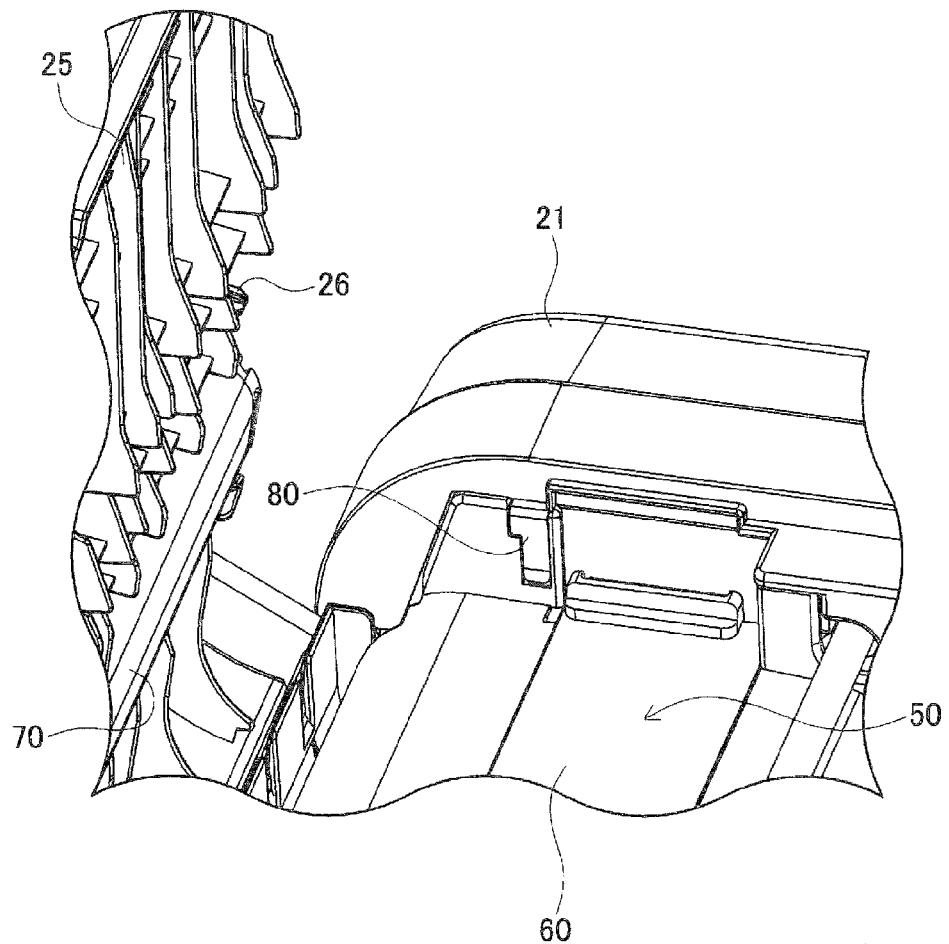
FIG. 10 is an enlarged perspective view of a modification of the openable member-side contact portion shown in FIG. 8.

The illustrative embodiment shows but is not limited to the main frame-side contact portion 80. The main frame-side contact portion 80 may have a recessed portion shown in FIG. 10. The recessed portion may prevent improper orientation of the main frame-side contact portion 80.

Although an illustrative embodiment and examples of modifications of the present invention have been described in detail herein, the scope of the invention is not limited thereto. It will be appreciated by those skilled in the art that various modifications may be made without departing from the scope of the invention. Accordingly, the embodiment and examples of modifications disclosed herein are merely illustrative. It is to be understood that the scope of the invention is not to be so limited thereby, but is to be determined by the claims which follow.

What is claimed is:
1. An image reading apparatus comprising:
a main unit;
a cover unit configured to be pivotable relative to the main unit, the cover unit including:
a metal frame;
a document tray configured to receive a document;
an ejection portion configured to receive the document;
a document conveying mechanism configured to convey the document from the document tray to the ejection portion along a conveying path extending in a U shape from the document tray to the ejection portion, the conveying path having an upper path, a lower path, and a curved path connecting the upper path and the lower path; and a cover unit-side reading device configured to read an image of the document conveyed through the upper path;

an openable unit configured to move between an open position to expose the upper path and a closed position to cover the upper path, the openable unit including a document pressing member, the document pressing member facing the cover unit-side reading device when the openable unit is in the closed position; and a conductive member configured to electrically connect the metal frame of the cover unit and the document pressing member of the openable unit, wherein the conductive member is formed of stainless steel.

2. An image reading apparatus comprising:

a main unit;

a cover unit configured to be pivotable relative to the main unit, the cover unit including:
   a metal frame;
   a document tray configured to receive a document;
   an ejection portion configured to receive the document;
   a document conveying mechanism configured to convey the document from the document tray to the ejection portion along a conveying path extending in a U shape from the document tray to the ejection portion, the conveying path having an upper path, a lower path, and a curved path connecting the upper path and the lower path; and
   a cover unit-side reading device configured to read an image of the document conveyed through the upper path;

an openable unit configured to move between an open position to expose the upper path and a closed position to cover the upper path, the openable unit including a document pressing member, the document pressing member facing the cover unit-side reading device when the openable unit is in the closed position; and a conductive member configured to electrically connect the metal frame of the cover unit and the document pressing member of the openable unit, wherein the document pressing member is formed of metal, wherein the conductive member includes a first conductive member and a second conductive member, wherein the first conductive member is disposed in the openable unit to contact the document pressing member, wherein the second conductive member is disposed in the cover unit and is connected to the metal frame, wherein, when the openable unit is in the closed position, the first conductive member is configured to contact the second conductive member such that conduction exists between the metal frame of the cover unit and the document pressing member of the openable unit, and wherein, when the openable unit is in the open position, the first conductive member is configured to separate from the second conductive member and interrupt the conduction between the metal frame and the document pressing member.

3. The image reading apparatus according to claim 2, wherein the first conductive member includes:
   an urging portion formed of metal and configured to contact the document pressing member at a position facing the cover unit-side reading device and to urge the document pressing member toward the cover unit-side reading device;
   a contact portion disposed on an end surface of the openable unit and formed of a metal wire, the contact portion being configured to contact the second conductive member; and
   a connection portion connecting the urging portion and the contact portion and being formed of a metal wire.

4. The image reading apparatus according to claim 2,
wherein the first conductive member includes a first contact portion,
wherein the second conductive member includes a second contact portion,
wherein the first contact portion and the second contact portion contact each other when the openable unit is in the closed position, and
wherein the first contact portion and the second contact portion are formed of stainless steel.

5. The image reading apparatus according to claim 3,
wherein the contact portion of the first conductive member is bent at a predetermined angle and is urged in a direction opposite to the urging portion on the end surface of the openable unit, and
wherein the openable unit includes a protection member having a slit, and the protection member is configured to enclose the contact portion such that the contact portion protrudes from the slit in the direction opposite to the urging portion.

6. The image reading apparatus according to claim 2, wherein the second conductive member is formed of a metal plate.

7. The image reading apparatus according to claim 6, wherein the metal plate has a recessed portion.

8. The image reading apparatus according to claim 2,
wherein the main unit includes a main unit main unit-side reading device configured to read an image of a first surface of the document conveyed through the lower path, and
wherein the cover unit-side reading device of the cover unit is configured to read an image of a second surface of the document conveyed through the upper path.

9. The image reading apparatus according to claim 8,
wherein the main unit includes a platen glass configured to support a further document thereon, and
wherein the main unit-side reading device is configured to read an image of the further document supported by the platen glass while moving.

* * * * *

UNITED STATES PATENT AND TRADEMARK OFFICE
CERTIFICATE OF CORRECTION

PATENT NO.         : 8,605,342 B2
APPLICATION NO.    : 13/073065
DATED              : December 10, 2013
INVENTOR(S)        : Takayuki Akimatsu It is certified that error appears in the above-identified patent and that said Letters Patent is hereby corrected as shown below:

Claims

Column 14, Claim 8, Line 43:
Please delete "a main unit main unit-side" and replace with --a main unit-side--

Signed and Sealed this
Twentieth Day of October, 2015

Michelle K. Lee
*Director of the United States Patent and Trademark Office*